(12) United States Patent
Murata

(10) Patent No.: US 11,920,973 B2
(45) Date of Patent: Mar. 5, 2024

(54) ANALYSIS DEVICE, ANALYSIS SYSTEM, AND ANALYSIS METHOD

(71) Applicant: KELK Ltd., Kanagawa (JP)

(72) Inventor: Tomonori Murata, Kanagawa (JP)

(73) Assignee: KELK Ltd., Kanagawa (JP)

(*) Notice: Subject to any disclaimer, the term of this patent is extended or adjusted under 35 U.S.C. 154(b) by 20 days.

(21) Appl. No.: 17/569,231

(22) Filed: Jan. 5, 2022

(65) Prior Publication Data

US 2022/0214210 A1 Jul. 7, 2022

(30) Foreign Application Priority Data

Jan. 7, 2021 (JP) .................................. 2021-001690

(51) Int. Cl.
*G01H 1/00* (2006.01)

(52) U.S. Cl.
CPC .................................. *G01H 1/003* (2013.01)

(58) Field of Classification Search
None
See application file for complete search history.

(56) References Cited

U.S. PATENT DOCUMENTS 10,031,500 B1 * 7/2018 Diaz .................... G05B 19/042

FOREIGN PATENT DOCUMENTS

| JP | 2005-341534 | 12/2005 |
| JP | 2007-170815 | 7/2007 |

* cited by examiner

*Primary Examiner* — Jermele M Hollington
*Assistant Examiner* — Carl F. R. Tchatchouang
(74) *Attorney, Agent, or Firm* — Fish & Richardson P.C.

(57) ABSTRACT

An analysis device includes a vibration sensor that detects vibration of a machine, a calculation unit that calculates an average value of detection data of the vibration sensor in each predetermined cycle interval, converts a plurality of data points included in each interval to one data point indicating the average value to reduce calculation points, and performs vibration analysis with the reduced calculation points, and a wireless communication device that transmits processed data output from the vibration analysis performed by the calculation unit.

9 Claims, 8 Drawing Sheets

ANALYSIS DEVICE, ANALYSIS SYSTEM, AND ANALYSIS METHOD

CROSS-REFERENCE TO RELATED APPLICATION(S)

The present application claims priority to and incorporates by reference the entire contents of Japanese Patent Application No. 2021-001690, filed in Japan on Jan. 7, 2021.

BACKGROUND OF THE INVENTION

1. Field of the Invention

The present disclosure relates to an analysis device, an analysis system, and an analysis method.

2. Description of the Related Art

For diagnosis of the presence/absence of abnormality in a machine, a technology is known to detect a vibration generated during the operation of the machine, with a vibration sensor. JP 2005-341534 A discloses a technology in which a moving average of a waveform is used as a variable low-pass filter (LPF) for vibration data continuously acquired for envelope processing, in frequency analysis of an original waveform for an impulse response. In addition, JP 2007-170815 A discloses a technology in which envelope analysis is performed after data points are reduced by decimation processing for conversion with reduced sampling frequency, for analyzing vibration data of a vehicle bearing to diagnose abnormality.

Incidentally, a large amount of energy is required for analysis to process a large amount of data, and it has been difficult to perform highly accurate calculation with energy saving. For example, in a method using the moving average as in JP 2005-341534 A, measurement points cannot be reduced, and power required for calculation cannot be reduced. Conversion with sampling frequency obtained by reducing the data points by the decimation processing, as in JP 2007-170815 A, leads to lack of original information obtained with higher sampling frequency.

An object of the present disclosure is to appropriately reduce data points for highly accurate calculation processing with energy saving.

SUMMARY OF THE INVENTION

It is an object of the present invention to at least partially solve the problems in the conventional technology.

According to an aspect of the present invention, an analysis device comprises: a vibration sensor that detects vibration of a machine; a calculation unit that calculates an average value of detection data of the vibration sensor in each predetermined cycle interval, converts a plurality of data points included in each interval to one data point indicating the average value to reduce calculation points, and performs vibration analysis with the reduced calculation points; and a wireless communication device that transmits processed data output from the vibration analysis performed by the calculation unit.

The above and other objects, features, advantages and technical and industrial significance of this invention will be better understood by reading the following detailed description of presently preferred embodiments of the invention, when considered in connection with the accompanying drawings.

DETAILED DESCRIPTION

Embodiments according to the present disclosure will be described below with reference to the drawings, but the present disclosure is not limited to the description. Component elements according to the embodiments described below may be appropriately combined with each other. Furthermore, some of the component elements are not used in some cases.

In the embodiments, an XYZ orthogonal coordinate system is set, and positional relationships between functional units will be described with reference to the XYZ orthogonal coordinate system. A direction parallel to an X-axis in a predetermined plane is represented as an X-axis direction, a direction parallel to a Y-axis orthogonal to the X-axis in the predetermined plane is represented as a Y-axis direction, and a direction parallel to a Z-axis orthogonal to the predetermined plane is represented as a Z-axis direction. An XY plane, including the X- and Y-axes, is parallel to the predetermined plane.

First Embodiment

Analysis Device

Figure 1:
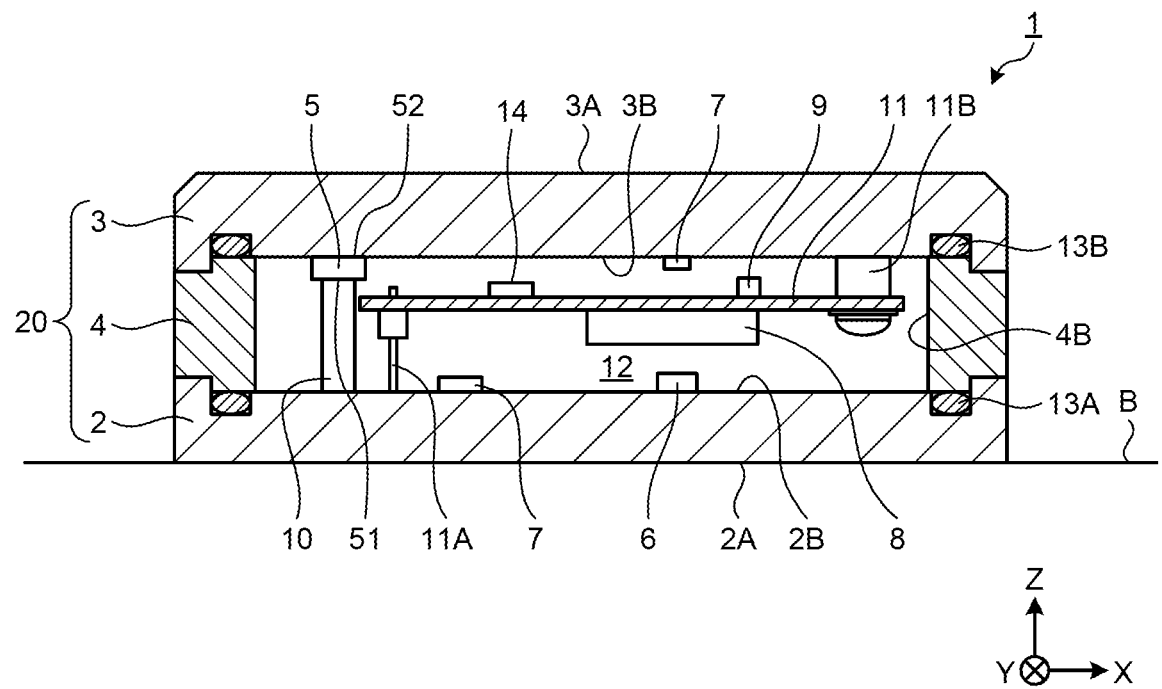
FIG. 1 is a cross-sectional view schematically illustrating an analysis device according to a first embodiment.

FIG. 1 is a cross-sectional view schematically illustrating an analysis device 1 according to the present embodiment. The analysis device 1 is installed on a machine B. The machine B is provided in an industrial facility such as a factory. An example of the machine B includes a rotary machine. An example of the rotary machine includes a motor that operates a pump.

As illustrated in FIG. 1, the analysis device 1 includes a heat reception portion 2, a heat release portion 3, a peripheral wall portion 4, a thermoelectric generation module 5, a vibration sensor 6, a microcomputer 8, a wireless communication device 9, a heat transfer member 10, a circuit board 11, and a power storage unit 14.

The heat reception portion 2 is installed on the machine B. The heat reception portion 2 is a plate-shaped member. The heat reception portion 2 is formed of a metal material such as aluminum or copper. The heat reception portion 2 receives heat from the machine B. The heat of the heat reception portion 2 is transferred to the thermoelectric generation module 5 via the heat transfer member 10.

The heat release portion 3 is opposed to the heat reception portion 2 with a space therebetween. The heat release portion 3 is a plate-shaped member. The heat release portion 3 is formed of a metal material such as aluminum or copper. The heat release portion 3 receives heat from the thermoelectric generation module 5. The heat of the heat release portion 3 is released into ambient air around the analysis device 1.

The heat reception portion 2 has a heat reception surface 2A that is opposed to a surface of the machine B and an inside surface 2B that faces in a direction opposite to the heat reception surface 2A. The heat reception surface 2A faces in a −Z direction. The inside surface 2B faces in a +Z direction. Each of the heat reception surface 2A and the inside surface 2B has a flat shape. Each of the heat reception surface 2A and the inside surface 2B is parallel to the XY plane. In the XY plane, the heat reception portion 2 has substantially a square outer shape. Note that the heat reception portion 2 may not have the square outer shape. The heat reception portion 2 may have a circular, elliptical, or any polygonal outer shape.

The heat release portion 3 has a heat release surface 3A that faces the ambient air and an inside surface 3B that faces in a direction opposite to the heat release surface 3A. The heat release surface 3A faces in the +Z direction. The inside surface 3B faces in the −Z direction. Each of the heat release surface 3A and the inside surface 3B has a flat shape. Each of the heat release surface 3A and the inside surface 3B is parallel to the XY plane. In the XY plane, the heat release portion 3 has substantially a square outer shape. Note that the heat release portion 3 may not have the square outer shape. The heat release portion 3 may have a circular, elliptical, or any polygonal outer shape.

In the XY plane, the heat reception portion 2 and the heat release portion 3 are substantially equal in outer shape and size. Note that the outer shape and size of the heat reception portion 2 and the outer shape and size of the heat release portion 3 may be different from each other.

The peripheral wall portion 4 is arranged between a peripheral edge portion of the inside surface 2B of the heat reception portion 2 and a peripheral edge portion of the inside surface 3B of the heat release portion 3. The peripheral wall portion 4 connects the heat reception portion 2 and the heat release portion 3. The peripheral wall portion 4 is formed of a synthetic resin.

In the XY plane, the peripheral wall portion 4 has an annular shape. In the XY plane, the peripheral wall portion 4 has substantially a square outer shape. The heat reception portion 2, the heat release portion 3, and the peripheral wall portion 4 define an inner space 12 of the analysis device 1. The peripheral wall portion 4 has an inside surface 4B that faces the inner space 12. The inside surface 2B of the heat reception portion 2 faces the inner space 12. The inside surface 3B of the heat release portion 3 faces the inner space 12. The outer space of the analysis device 1 is the ambient air around the analysis device 1.

The heat reception portion 2, the heat release portion 3, and the peripheral wall portion 4 function as a housing of the analysis device 1 that defines the inner space 12. In the following description, the heat reception portion 2, the heat release portion 3, and the peripheral wall portion 4 are collectively referred to as a housing 20 appropriately.

A sealing member 13A is arranged between the peripheral edge portion of the inside surface 2B of the heat reception portion 2 and an end surface on the −Z side of the peripheral wall portion 4. A sealing member 13B is arranged between the peripheral edge portion of the inside surface 3B of the heat release portion 3 and an end surface on the +Z side of the peripheral wall portion 4. Each of the sealing member 13A and the sealing member 13B includes, for example, an O-ring. The sealing member 13A is arranged in a recess provided in the peripheral edge portion of the inside surface 2B. The sealing member 13B is arranged in a recess provided in the peripheral edge portion of the inside surface 3B. The sealing member 13A and the sealing member 13B inhibit foreign matter in the outer space of the analysis device 1 from entering the inner space 12.

The thermoelectric generation module 5 uses a Seebeck effect to generate power. The machine B functions as a heat source for the thermoelectric generation module 5. The thermoelectric generation module 5 is arranged between the heat reception portion 2 and the heat release portion 3. An end surface 51 on the −Z side of the thermoelectric generation module 5 is heated, a temperature difference is generated between the end surface 51 on the −Z side and an end surface 52 on the +Z side of the thermoelectric generation module 5, and thereby the thermoelectric generation module 5 generates power.

The end surface 51 faces in the −Z direction. The end surface 52 faces in the +Z direction. Each of the end surface 51 and the end surface 52 has a flat shape. Each of the end surface 51 and the end surface 52 is parallel to the XY plane. In the XY plane, the thermoelectric generation module 5 has substantially a square outer shape.

The end surface 52 is opposed to the inside surface 3B of the heat release portion 3. The thermoelectric generation module 5 is fixed to the heat release portion 3. The heat release portion 3 and the thermoelectric generation module 5 are bonded to each other, for example, by adhesive.

Note that in the example illustrated in FIG. 1, the thermoelectric generation module 5 is in contact with the heat release portion 3 but may be in contact with the heat reception portion 2.

The vibration sensor 6 detects the vibration of the machine B. The vibration sensor 6 is driven by power generated by the thermoelectric generation module 5. The vibration sensor 6 is arranged in the inner space 12. In the present embodiment, the vibration sensor 6 is supported on the inside surface 2B of the heat reception portion 2.

An example of the vibration sensor 6 includes an acceleration sensor. Note that the vibration sensor 6 may be a speed sensor or a displacement sensor. In the present embodiment, the vibration sensor 6 is configured to detect the vibration of the machine B in three directions of the X-axis direction, Y-axis direction, and Z-axis direction.

The microcomputer 8 controls the analysis device 1. The microcomputer 8 is driven by power generated by the thermoelectric generation module 5. The microcomputer 8 is arranged in the inner space 12. In the present embodiment, the microcomputer 8 is supported on the circuit board 11.

The wireless communication device 9 communicates with a management computer 100 (see FIG. 3, etc.) being outside the analysis device 1. The wireless communication device 9 is driven by power generated by the thermoelectric generation module 5. The wireless communication device 9 is arranged in the inner space 12. In the present embodiment, the wireless communication device 9 is supported on the circuit board 11.

The heat transfer member 10 connects the heat reception portion 2 and the thermoelectric generation module 5. The heat transfer member 10 transfers the heat of the heat reception portion 2 to the thermoelectric generation module 5. The heat transfer member 10 is formed of a metal material such as aluminum or copper. The heat transfer member 10 is a rod-shaped member elongated in the Z-axis direction. The heat transfer member 10 is arranged in the inner space 12.

The circuit board 11 includes a control board. The circuit board 11 is arranged in the inner space 12. The circuit board 11 is connected to the heat reception portion 2 via a support member 11A. The circuit board 11 is connected to the heat release portion 3 via a support member 11B. The circuit board 11 is supported by the support member 11A and the support member 11B so as to be separated from each of the heat reception portion 2 and the heat release portion 3.

The power storage unit 14 stores power generated by the thermoelectric generation module 5. An example of the power storage unit 14 includes a capacitor or a secondary battery.

Thermoelectric Generation Module

Figure 2:
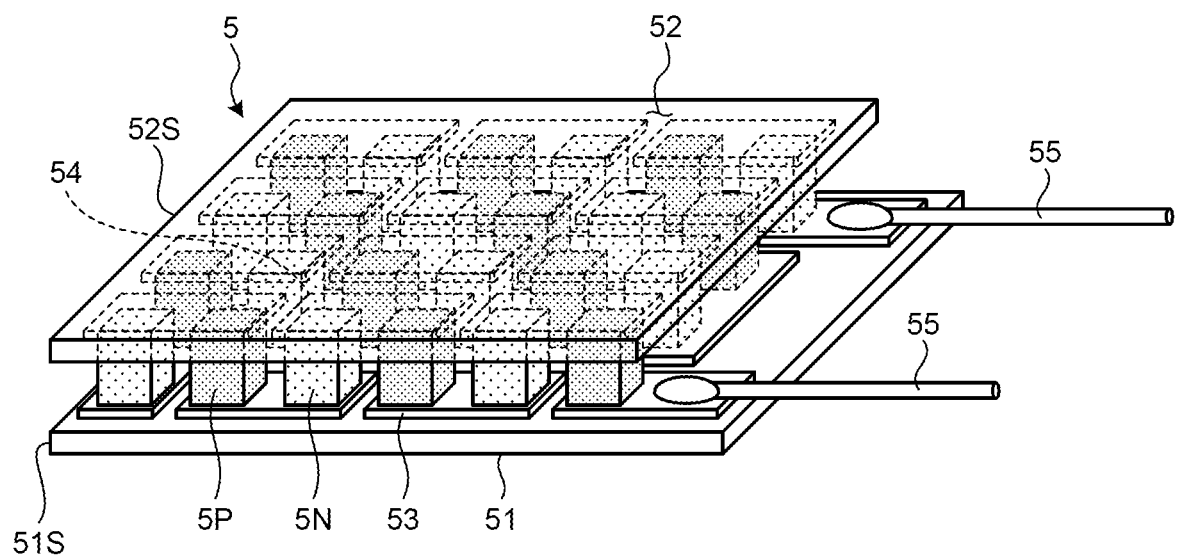
FIG. 2 is a perspective view schematically illustrating a thermoelectric generation module according to the first embodiment.

FIG. 2 is a perspective view schematically illustrating the thermoelectric generation module 5 according to the present embodiment. As illustrated in FIG. 2, the thermoelectric generation module 5 includes p-type thermoelectric semiconductor devices 5P, n-type thermoelectric semiconductor devices 5N, first electrodes 53, second electrodes 54, a first substrate 51S, and a second substrate 52S. In the XY plane, the p-type thermoelectric semiconductor devices 5P and the n-type thermoelectric semiconductor devices 5N are arranged alternately. Each of the first electrodes 53 is connected to each of the p-type thermoelectric semiconductor devices 5P and n-type thermoelectric semiconductor devices 5N. Each of the second electrodes 54 is connected to each of the p-type thermoelectric semiconductor devices 5P and the n-type thermoelectric semiconductor devices 5N. A lower surface of each p-type thermoelectric semiconductor device 5P and a lower surface of each n-type thermoelectric semiconductor device 5N are connected to each first electrode 53. An upper surface of each p-type thermoelectric semiconductor device 5P and an upper surface of each n-type thermoelectric semiconductor device 5N are connected to each second electrode 54. The first electrode 53 is connected to the first substrate 51S. The second electrode 54 is connected to the second substrate 52S.

Each of the p-type thermoelectric semiconductor device 5P and the n-type thermoelectric semiconductor device 5N includes, for example, a BiTe-based thermoelectric material. Each of the first substrate 51S and the second substrate 52S is formed of an electrical insulating material such as ceramics or polyimide.

The first substrate 51S has the end surface 51. The second substrate 52S has the end surface 52. In response to heating the first substrate 51S, a temperature difference is generated between end portions on the +Z side and −Z side of each p-type thermoelectric semiconductor device 5P and n-type thermoelectric semiconductor device 5N. In response to generation of the temperature difference between the end portions on the +Z side and −Z side of the p-type thermoelectric semiconductor device 5P, holes move in the p-type thermoelectric semiconductor device 5P. In response to generation of the temperature difference between the end portions on the +Z side and −Z side of the n-type thermoelectric semiconductor device 5N, electrons move in the n-type thermoelectric semiconductor device 5N. The p-type thermoelectric semiconductor device 5P and the n-type thermoelectric semiconductor device 5N are connected via the first electrode 53 and the second electrode 54. A potential difference is generated between the first electrode 53 and the second electrode 54 due to the holes and the electrons. The thermoelectric generation module 5 generates power due to the potential difference between the first electrode 53 and the second electrode 54. A lead wire 55 is connected to the first electrode 53. The thermoelectric generation module 5 outputs power via the lead wire 55.

Microcomputer

Figure 3:
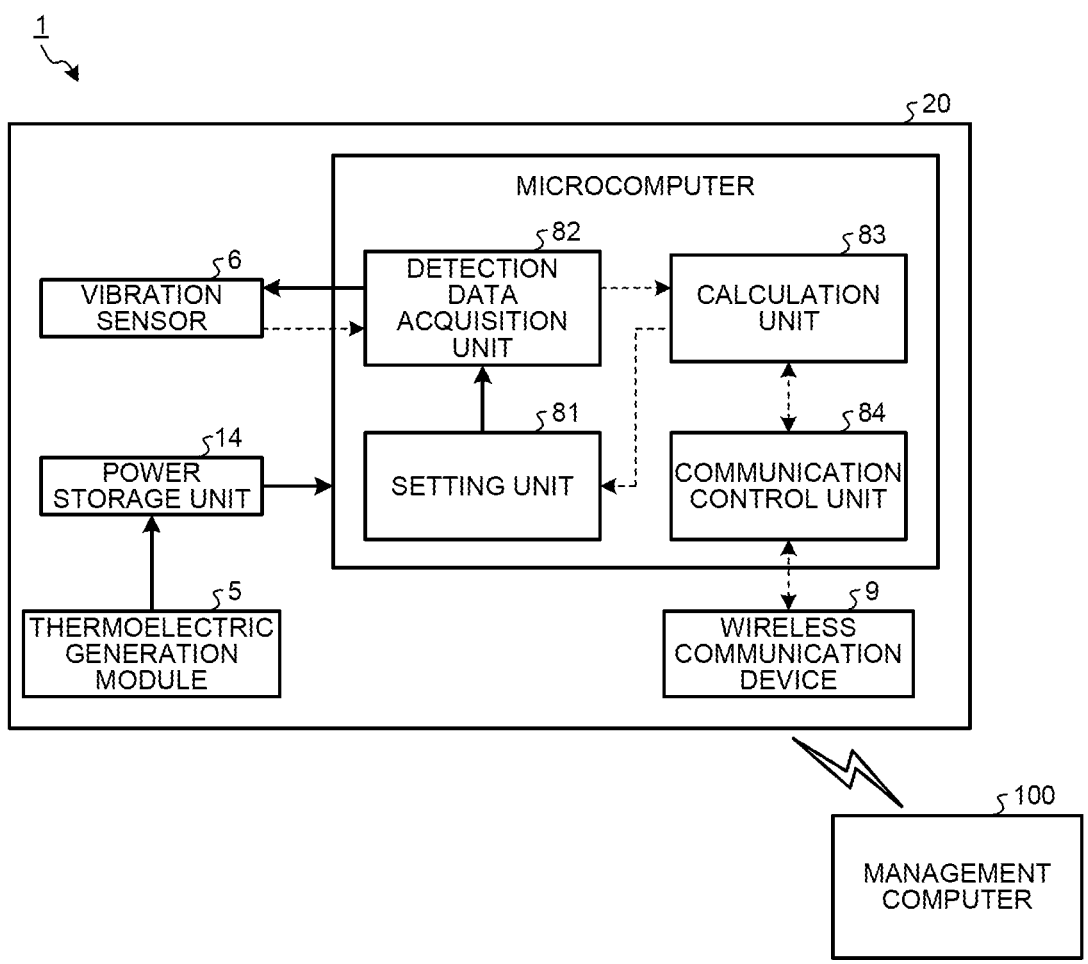
FIG. 3 is a block diagram illustrating the analysis device according to the first embodiment.

FIG. 3 is a block diagram illustrating the analysis device 1 according to the present embodiment. As illustrated in FIG. 3, the thermoelectric generation module 5, the power storage unit 14, the vibration sensor 6, the microcomputer 8, and the wireless communication device 9 are housed in one housing 20.

The microcomputer 8 includes a setting unit 81, a detection data acquisition unit 82, a calculation unit 83, and a communication control unit 84.

The setting unit 81 sets a measurement time to measure the vibration of the machine B by the vibration sensor 6. The measurement time may be set by an operator, for example, from the management computer 100 via wireless communication. Note that the sampling frequency may be set by the operator from the management computer 100 via wireless communication. In this case, the setting unit 81 sets the measurement time on the basis of the sampling frequency.

The detection data acquisition unit 82 acquires detection data of the vibration sensor 6 obtained in the measurement time and at the sampling frequency that are set in the setting unit 81. The detection data of the vibration sensor 6 includes a vibration waveform. The detection data acquisition unit 82 acquires detection data obtained in the measurement time and at the sampling frequency that are set by the setting unit 81.

The calculation unit 83 causes the microcomputer 8 to execute a program stored in advance. The calculation unit 83 performs calculation processing on the basis of the detection data of the vibration sensor 6 acquired by the detection data acquisition unit 82, outputting the processed data. The processed data refers to data generated by performing data processing on the detection data. The calculation unit 83 is configured to process the detection data of the vibration sensor 6 on the basis of a vibration analysis method such as fast Fourier transform (FFT) and output the processed data.

The calculation unit 83 performs absolute value processing to convert the value of each calculation point of the vibration waveform (acceleration data) acquired by the detection data acquisition unit 82, to an absolute value, generating absolute value processed correction data. The absolute value processing refers to processing of squaring the value of each calculation point and calculating a square root thereof. As the absolute value processing, processing of only calculating the square of the value of each calculation point may be performed. Before performing the absolute value processing, the calculation unit 83 may perform, for example, processing using high pass filter (HPF) as a band pass filter (BPF).

Calculation points after the reduction may be set by the operator, for example, from the management computer 100 via wireless communication. Note that a maximum value of a necessary frequency bandwidth, or the sampling frequency obtained after reduction of data points may be set by the operator from the management computer 100 via wireless communication. In this configuration, the setting unit 81 sets calculation points after the reduction, on the basis of the maximum value of the necessary frequency bandwidth or on the basis of the sampling frequency obtained after the reduction of the data points.

The calculation unit 83 divides the absolute value processed correction data into predetermined cycle intervals based on the set, number of calculation points after the reduction. The calculation unit 83 performs interval averaging process of calculating an average value of the absolute value processed correction data in each interval and converting the value of a plurality of calculation points included in each interval, to one data point indicating an average value, and generates interval averaged correction data. The calculation unit 83 performs the fast Fourier transform analysis on the interval averaged correction data, and outputs distribution data of power spectral density [$(m/s^2)^2$/Hz] for each frequency [Hz], as the processed data. The calculation unit 83 may further convert the power spectral density into decibels and output sensitivity [dB] for each frequency [Hz], as processed data.

The processed data generated by the calculation unit 83 may include, for example, at least one of a peak value, an effective value, and a frequency of vibration of the machine B that are calculated on the basis of the detection data of the vibration sensor 6.

The calculation unit 83 may process the detection data of the vibration sensor 6 to calculate the peak value of the vibration of the machine B. The peak value of the vibration includes a maximum value and a minimum value of the vibration. The peak value of the vibration may be a peak value in the entire range of the vibration waveform or may be a peak value in each of a plurality of frequency ranges of the vibration waveform. The peak value of the vibration may be a peak value of acceleration, a peak value of velocity, or a peak value of displacement.

The calculation unit 83 may process the detection data of the vibration sensor 6 to calculate the effective value (root mean square value: RMS) of the vibration of the machine B. Furthermore, the calculation unit 83 may divide the entire range of the vibration waveform detected by the vibration sensor 6 into a plurality of frequency ranges to calculate the effective value for each of the plurality of frequency ranges. The effective value of vibration may be an effective value of acceleration, an effective value of velocity, or an effective value of displacement.

The calculation unit 83 may process the detection data of the vibration sensor 6 to calculate the frequency of the vibration of the machine B. The calculation unit 83 may process the detection data of the vibration sensor 6 to calculate an overall value of the vibration. The overall value refers to the sum of power spectra in the entire range of frequencies to be subjected to the fast Fourier transform analysis.

The calculation unit 83 may process the detection data of the vibration sensor 6 to calculate a crest factor (CF) of the machine B. The crest factor refers to a ratio (peak value/ effective value) of the peak value to the effective value.

The communication control unit 84 causes the wireless communication device 9 to communicate with the management computer 100. When the wireless communication device 9 receives the setting data for setting the measurement time, the sampling frequency, the calculation points after the reduction, the maximum value of the necessary frequency bandwidth, the sampling frequency after the reduction of the data points, or the like from the management computer 100, the communication control unit 84 outputs the received setting data to the calculation unit 83. The calculation unit 83 causes the setting unit 81 to set the measurement time and the sampling frequency, on the basis of the acquired setting data about the measurement time or the sampling frequency. In addition, the calculation unit 83 sets the calculation points after the reduction, on the basis of the setting data about the calculation points after the reduction, the maximum value of the necessary frequency bandwidth, or the sampling frequency after the reduction of the data points.

Furthermore, the communication control unit 84 controls the wireless communication device 9 so as to transmit the detection data of the vibration sensor 6 acquired by the detection data acquisition unit 82 to the management computer 100. The wireless communication device 9 transmits the detection data of the vibration sensor 6 acquired by the detection data acquisition unit 82 to the management computer 100.

Furthermore, when the processed data is output by the calculation unit 83, the communication control unit 84 controls the wireless communication device 9 so as to transmit the processed data to the management computer 100. The wireless communication device 9 transmits the processed data calculated by the calculation unit 83 to the management computer 100.

Analysis Method

Figure 4:
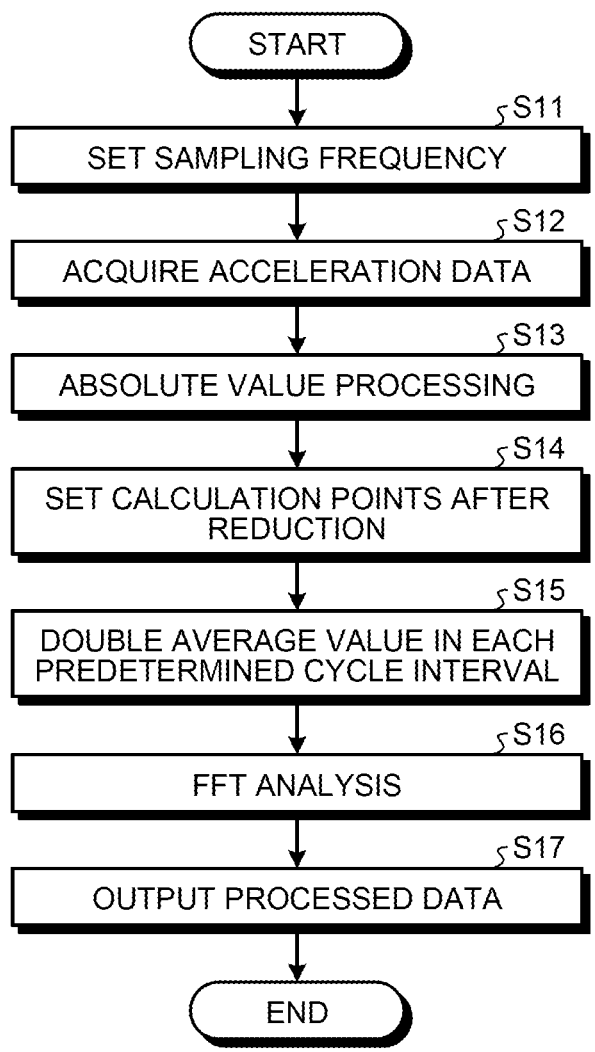
FIG. 4 is a flowchart illustrating an analysis method according to the first embodiment.

FIG. 4 is a flowchart illustrating an analysis method according to the present embodiment. The machine B on which the analysis device 1 is installed is the motor that is a kind of the rotary machine. The motor operates the pump. In the analysis method of the present embodiment, the power spectral density [$(m/s^2)^2$/Hz] for each frequency [Hz] is output as the processed data in order to diagnose the presence/absence of scratches on the bearing of the motor.

In the analysis device 1, the setting unit 81 sets the measurement time to measure the vibration of the machine B by the vibration sensor 6, on the basis of, for example, the setting data set from the management computer 100 via wireless communication. The setting unit 81 sets the sampling frequency, on the basis of sampling points determined according to memory capacity of the microcomputer 8 and the set measurement time (Step S11).

The detection data acquisition unit 82 acquires raw data about the vibration waveform, as the detection data, from the vibration sensor 6. The raw data about the vibration waveform is the acceleration data based on the measurement time and the sampling points sampled with the sampling frequency (ODR), which are set by the setting unit 81 (Step S12).

The calculation unit 83 performs the absolute value processing of calculating the absolute value of each calculation point of the acceleration data acquired by the detection data acquisition unit 82 in Step S12 and converting the value of each calculation point of the acceleration data to the absolute value (Step S13). The calculation unit 83 generates the absolute value processed correction data by the absolute value processing.

Figure 5:
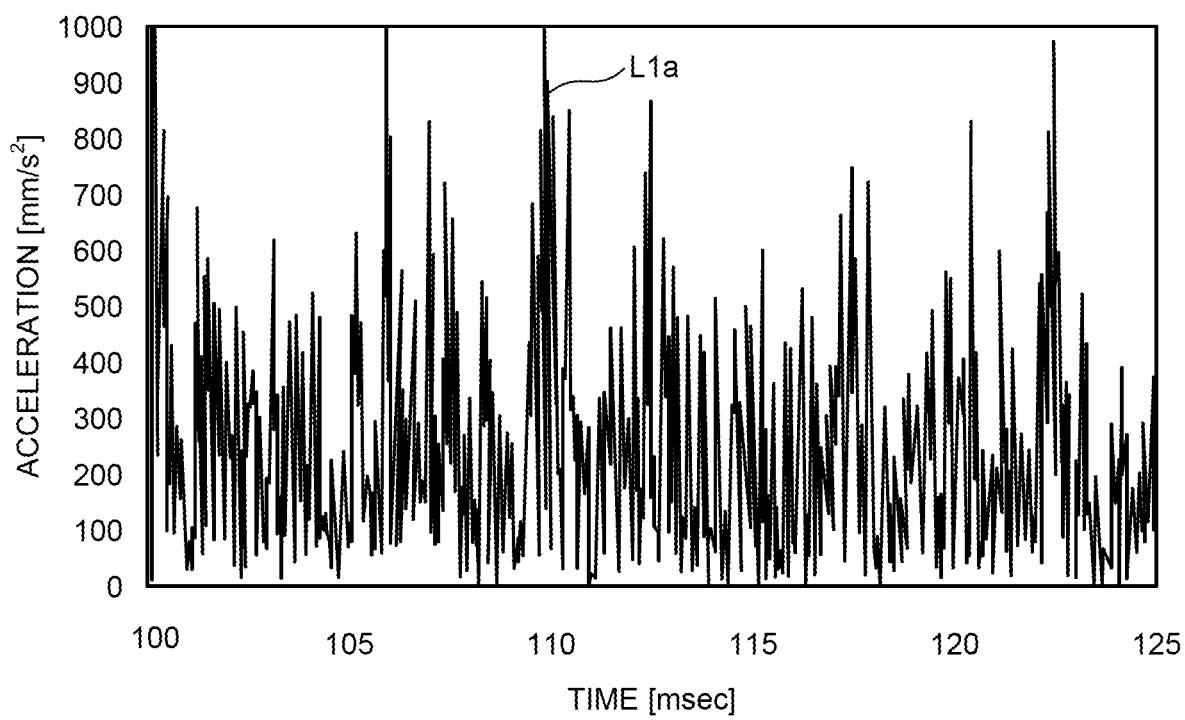
FIG. 5 is a graph illustrating an example of absolute value processed correction data in the analysis method according to the first embodiment.

FIG. 5 is a graph illustrating an example of the absolute value processed correction data in the analysis method according to the present embodiment. In FIG. 5, the vertical axis represents the absolute value of the acceleration [$m/s^2$] detected by the vibration sensor 6, and the horizontal axis represents time [msec].

As illustrated in FIG. 5, the values of the respective data points of the acceleration data acquired in Step S12 illustrated in FIG. 4 are converted to absolute values by the absolute value processing. In the example illustrated in FIG. 5, in the absolute value processing by the calculation unit 83, the value of each calculation point of the acceleration data acquired in Step S12 illustrated in FIG. 4 is squared to calculate the square root thereof. Therefore, the calculation unit 83 is allowed to generate the absolute value processed correction data of the vibration waveform as indicated by a line L1*a* in FIG. 5.

For example, on the basis of the setting data set from the management computer 100 via wireless communication, the calculation unit 83 sets the calculation points after the reduction before FFT analysis (Step S14). In the present embodiment, for example, 1024 calculation points are set.

The calculation unit 83 divides the absolute value processed correction data generated in Step S13 into predetermined cycle intervals based on the calculation points after the reduction that is set in Step S14. In the present embodiment, 8192 sampling points are set at the time of measurement and 1024 calculation points are provided after the reduction. Accordingly, the absolute value processed correction data is divided into intervals every eight points.

The calculation unit 83 performs the interval averaging process of doubling the average value of the absolute value processed correction data generated in Step S13 in each predetermined cycle interval, and converting a plurality of data points included in each interval to the one data point indicating the average value (Step S15). The calculation unit 83 generates the interval averaged correction data by the interval averaging process.

In other words, in the present embodiment, an average value of eight points in each interval is calculated, first. Next, the interval averaged correction data having a waveform in which the average value is associated with the time corresponding to the interval is generated. The time corresponding to the interval is, for example, the time corresponding to the first point of a plurality of points included in the interval or the time at the center of the interval. Therefore, the interval averaged correction data, the data points of which are reduced to ⅛ of those of the absolute value processed correction data is generated.

Figure 6:
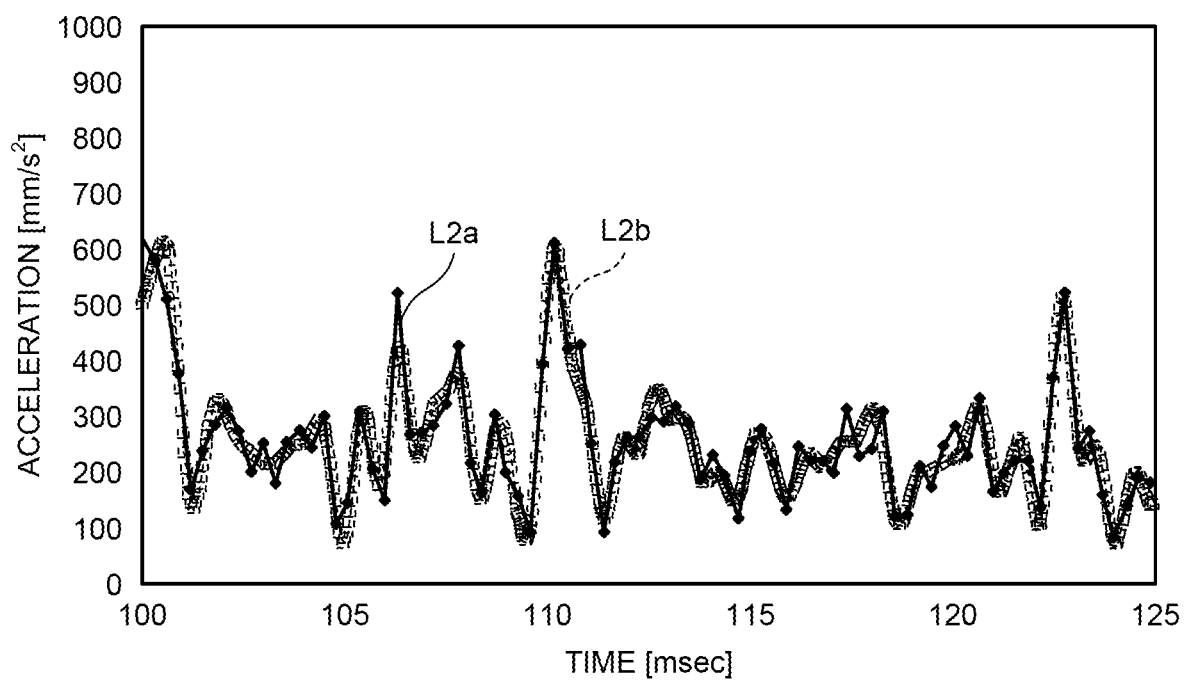
FIG. 6 is a graph illustrating an example of interval averaged correction data in the analysis method according to the first embodiment.

FIG. 6 is a diagram illustrating an example of the interval averaged correction data in the analysis method according to the present embodiment. In FIG. 6, the vertical axis represents acceleration [m/s$^2$], and the horizontal axis represents time [msec].

As indicated by a line L2a in FIG. 6, the points of the absolute value processed correction data generated in Step S13 illustrated in FIG. 4 are converted to one data point averaged in each predetermined cycle interval. Therefore, the calculation unit 83 is allowed to generate the interval averaged correction data of the vibration waveform as indicated by the line L2a in FIG. 6. In other words, the number of data points of the interval averaged correction data is (1 point)/(original data points included in each interval) times larger than those of the calculation points of the acceleration data and those of the calculation points of the absolute value processed correction data, and is ⅛ in the present embodiment.

A line L2b in FIG. 6 is comparison data generated by performing finite impulse response (FIR) filter processing as low-pass filter processing, on the absolute value processed correction data instead of Steps S14 and S15 illustrated in FIG. 4. Note that the calculation points of the comparison data is not reduced from those for the acceleration data and absolute value processed correction data.

As illustrated in FIG. 6, the line L2a indicating the interval averaged correction data of the present embodiment for which the calculation points is reduced can reproduce the characteristics of the waveform of the line L2b indicating the comparison data obtained by the low-pass filter processing without reducing the calculation points.

The calculation unit 83 performs the FFT analysis on the interval averaged correction data generated in Step S15 (Step S16). The calculation unit 83 generates a distribution of the power spectral density [(m/s$^2$)$^2$/Hz] for each frequency [Hz] by the FFT analysis. The calculation unit 83 causes the wireless communication device 9 to transmit the generated distribution data of the power spectral density for each frequency as the processed data. The wireless communication device 9 transmits the processed data to the management computer 100 (Step S17).

Figure 7:
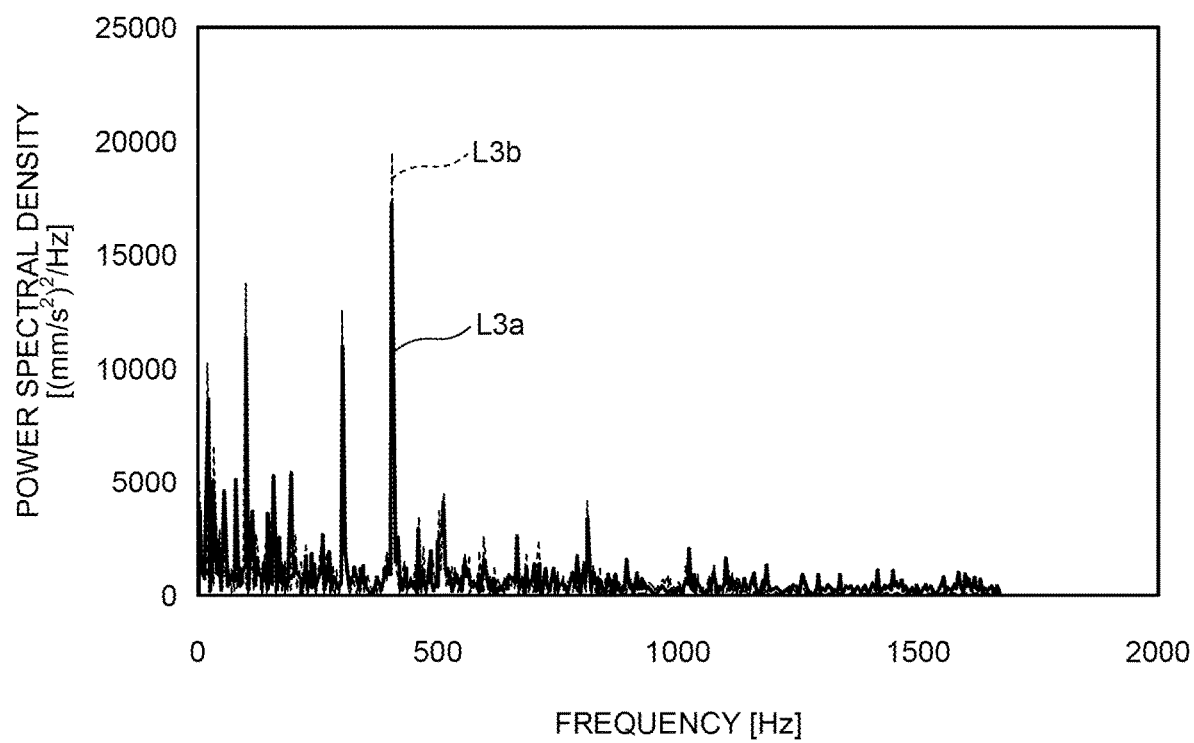
FIG. 7 is a graph illustrating an example of processed data in the analysis method according to the first embodiment.

FIG. 7 is a graph illustrating an example of the processed data in the analysis method according to the present embodiment. In FIG. 7, the vertical axis represents power spectral density [(m/s$^2$)$^2$/Hz], and the horizontal axis represents the frequency [Hz].

As indicated by a line L3a in FIG. 7, the distribution data of the power spectral density for each frequency is generated by FFT analysis, on the basis of the interval averaged correction data generated in Step S15 illustrated in FIG. 4. In other words, the calculation unit 83 performs the FFT analysis on the interval averaged correction data for which the calculation points has been reduced from those of the acceleration data and absolute value processed correction data by interval average correction processing.

A line L3b in FIG. 7 indicates comparison data about the distribution of power spectral density for each frequency generated by the FFT analysis on the basis of the comparison data indicated by the line L2b in FIG. 6. Note that the calculation points of the comparison data is not reduced from those for the acceleration data and absolute value processed correction data.

As illustrated in FIG. 7, the line L3a indicating the distribution data of the power spectral density for each frequency of the present embodiment for which the calculation points are reduced can reproduce the characteristics of the waveform of the line L3b indicating the comparison data subjected to the low-pass filter processing, without reducing the calculation points before the FFT analysis.

The management computer 100 is configured to monitor and manage the state of the machine B, on the basis of the transmitted processed data. The management computer 100 is configured to diagnose the presence/absence of abnormality in the machine B, on the basis of the transmitted processed data.

Effects

As described above, according to the present embodiments, the vibration sensor 6 is installed on the machine B. The detection data of the vibration sensor 6 is output to the microcomputer 8. The calculation unit 83 of the microcomputer 8 calculates the average value of the detection data of the vibration sensor 6, in each predetermined cycle interval. The calculation unit 83 converts a plurality of data points included in each interval to one data point indicating the average value to reduce the calculation points, and performs vibration analysis with the reduced calculation points. As described above, a calculation load can be suppressed by appropriately reducing the calculation points to be subjected to the calculation processing by the analysis method of the present embodiment. Therefore, this configuration makes it possible to output an analysis result maintaining necessary and sufficient accuracy even with low power consumption.

The processed data output from the vibration analysis performed by the calculation unit 83 is transmitted from the wireless communication device 9 to the management computer 100. Therefore, the management computer 100 is configured to appropriately diagnose the machine B on the basis of the analysis result calculated with the calculation points appropriately reduced.

The calculation unit 83 converts the value of each data point of the detection data of the vibration sensor 6 to the absolute value, before reducing the calculation points. In other words, the calculation unit 83 converts the acceleration data in which positive and negative values are mixed, to data having only positive values. Therefore, the average value in each interval can be calculated on the basis of the absolute values, and thus, the calculation unit 83 is allowed to suppress an error in reduction of the calculation points.

The microcomputer 8 of the analysis device 1 includes the setting unit 81 that sets the sampling frequency with which the detection data is acquired, on the basis of the sampling points determined according to the memory capacity, and the set measurement time. This configuration makes it possible to set the sampling frequency to a maximum value within a range satisfying limitation due to the memory capacity and a condition of a necessary measurement time. In other words, the calculation points to be subjected to the calculation processing can be appropriately reduced by the analysis method of the present embodiment, after measurement with a high frequency. Therefore, this configuration makes it possible to output the analysis result maintaining necessary and sufficient accuracy even with low power consumption, while suppressing the calculation load.

Second Embodiment

A second embodiment will be described. In the following description, component elements that are the same as or equivalent to those in the above first embodiment are denoted by the same reference numerals and symbols, and description thereof will be simplified or omitted. A physical configuration of the analysis device 1 according to the second embodiment is similar to that of the first embodiment, and is characterized by processing by the calculation unit 83.

In the present embodiment, the calculation unit 83 performs integration processing to integrate acceleration and acquire the speed of a vibration waveform (acceleration data) acquired by the detection data acquisition unit 82, generating integrated correction data. Before performing the integration processing, the calculation unit 83 may perform, for example, processing using a high-pass filter as a band pass filter.

The calculation unit 83 performs extraction processing of extracting speed data in each predetermined cycle based on set calculation points after reduction, from the integrated correction data to generate extracted correction data. In the extraction processing, for example, data points other than the first data point are deleted, from a plurality of data points included in each interval. If the extraction is performed for each predetermined cycle, points extracted may be any point in each interval.

The calculation unit 83 performs fast Fourier transform analysis on the extracted correction data, and outputs distribution data of power spectral density $[(m/s)^2/Hz]$ for each frequency [Hz], as processed data. The calculation unit 83 may further convert the power spectral density into decibels and output sensitivity [dB] for each frequency [Hz], as processed data.

Analysis Method

Figure 8:
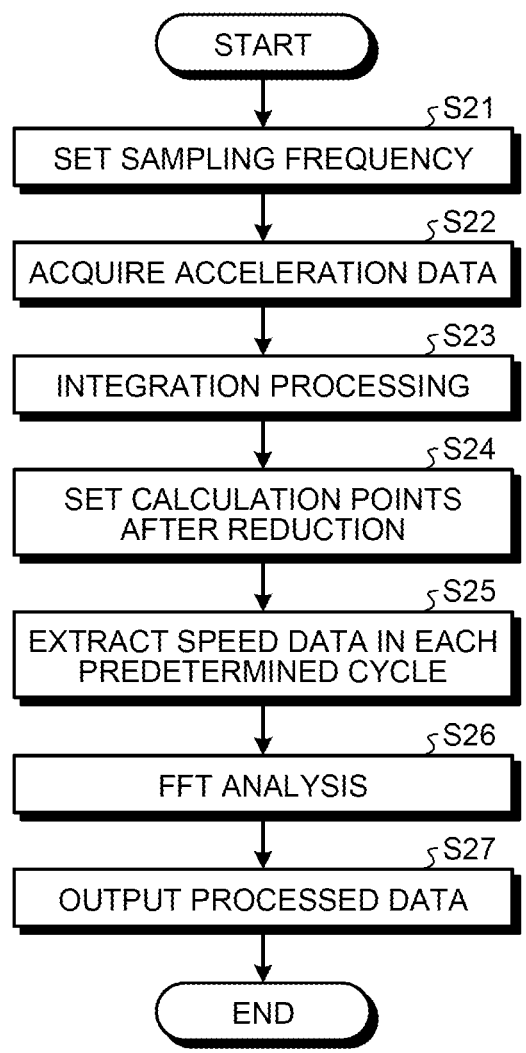
FIG. 8 is a flowchart illustrating an analysis method according to a second embodiment.

FIG. 8 is a flowchart illustrating an analysis method according to the present embodiment. The machine B on which the analysis device 1 is installed is the motor that is a kind of the rotary machine. The motor operates the pump. In the analysis method of the present embodiment, the power spectral density [(m/s)/Hz] for each frequency [Hz] is output as the processed data in order to diagnose the installation situation of the rotary machine.

Processing from Step S21 to Step S22 is similar to the processing from Step S11 to Step S12 of the first embodiment illustrated in FIG. 4, and the description thereof will be omitted.

The calculation unit 83 performs the integration processing of integrating the acceleration and acquiring the speed data, on the acceleration data acquired by the detection data acquisition unit 82 in Step S22 (Step S23). The calculation unit 83 generates integrated data by the integration processing.

The processing of Step S25 is similar to the processing of Step S15 of the first embodiment illustrated in FIG. 4, and the description thereof will be omitted.

The calculation unit 83 performs the extraction processing of extracting the speed data in each predetermined cycle, from the integrated correction data generated in Step S23, on the basis of the calculation points after the reduction that is set in Step S24 (Step S25). The calculation unit 83 generates the extracted correction data by the extraction processing.

In other words, in the present embodiment, the extracted correction data is generated first. The extracted correction data is a waveform obtained by extracting only one data point of the speed data from the eight data points of the speed data in each interval. Therefore, the extracted correction data, the data points of which are reduced to ⅛ of those of the integrated correction data is generated.

The calculation unit 83 performs FFT analysis on the extracted correction data generated in Step S15 (Step S26). The calculation unit 83 generates the distribution of the power spectral density $[(m/s)^2/Hz]$ for each frequency [Hz] by the FFT analysis. The calculation unit 83 causes the wireless communication device 9 to transmit the generated distribution data of the power spectral density for each frequency as the processed data. The wireless communication device 9 transmits the processed data to the management computer 100 (Step S27).

Figure 9:
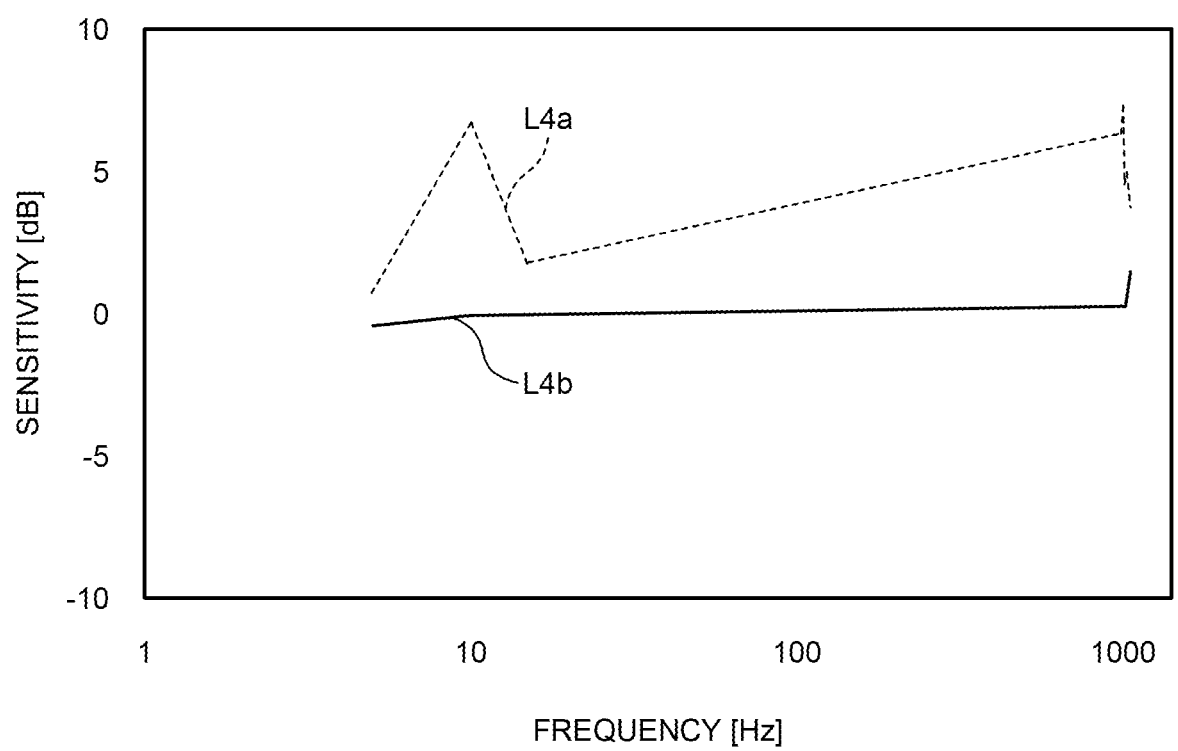
FIG. 9 is a graph illustrating an example of processed data in the analysis method according to the second embodiment.

FIG. 9 is a graph illustrating an example of the processed data in the analysis method according to the present embodiment. In FIG. 9, the vertical axis represents sensitivity [dB], and the horizontal axis represents frequency [Hz]. The processed data illustrated in FIG. 9 indicates the frequency dependence of the effective value calculated on the basis of the speed calculated from the acceleration by the calculation unit 83 by using the analysis method illustrated in FIG. 8. A line L4*a* indicates effective value data that is obtained on the basis of the speed calculated after conversion of the acceleration data with the sampling frequency reduced by the decimation processing. A line L4*b* indicates effective value data that is obtained on the basis of the data points reduced after calculation of the speed from the acceleration.

As illustrated in FIG. 9, the line L4*b* indicating the sensitivity calculated by the analysis method of the present embodiment shows a favorable characteristic, but the line L4*a* has a large deviation due to poor accuracy in integration of the acceleration to obtain the speed.

Effects

As described above, according to the present embodiment, the vibration sensor 6 is installed on the machine B as in the first embodiment. The detection data of the vibration sensor 6 is output to the microcomputer 8. The calculation unit 83 of the microcomputer 8 integrates the acceleration data of the detection data of the vibration sensor 6 to acquire the speed data, extracts the speed data in each predetermined cycle to reduce the calculation points, and performs vibration analysis with the reduced calculation points. As described above, the number of the calculation points to be subjected to the calculation processing is appropriately reduced by the analysis method of the present embodiment. Therefore, this configuration makes it possible to output an analysis result maintaining necessary and sufficient accuracy even with low power consumption.

The processed data output from the vibration analysis performed by the calculation unit 83 is transmitted from the wireless communication device 9 to the management computer 100. Therefore, the management computer 100 is configured to appropriately diagnose the machine B on the basis of the analysis result calculated with the calculation points appropriately reduced.

Third Embodiment

A third embodiment will be described. In the following description, component elements that are the same as or equivalent to those in the above first and second embodiments are denoted by the same reference numerals and symbols, and description thereof will be simplified or omitted.

Analysis System

Figure 10:
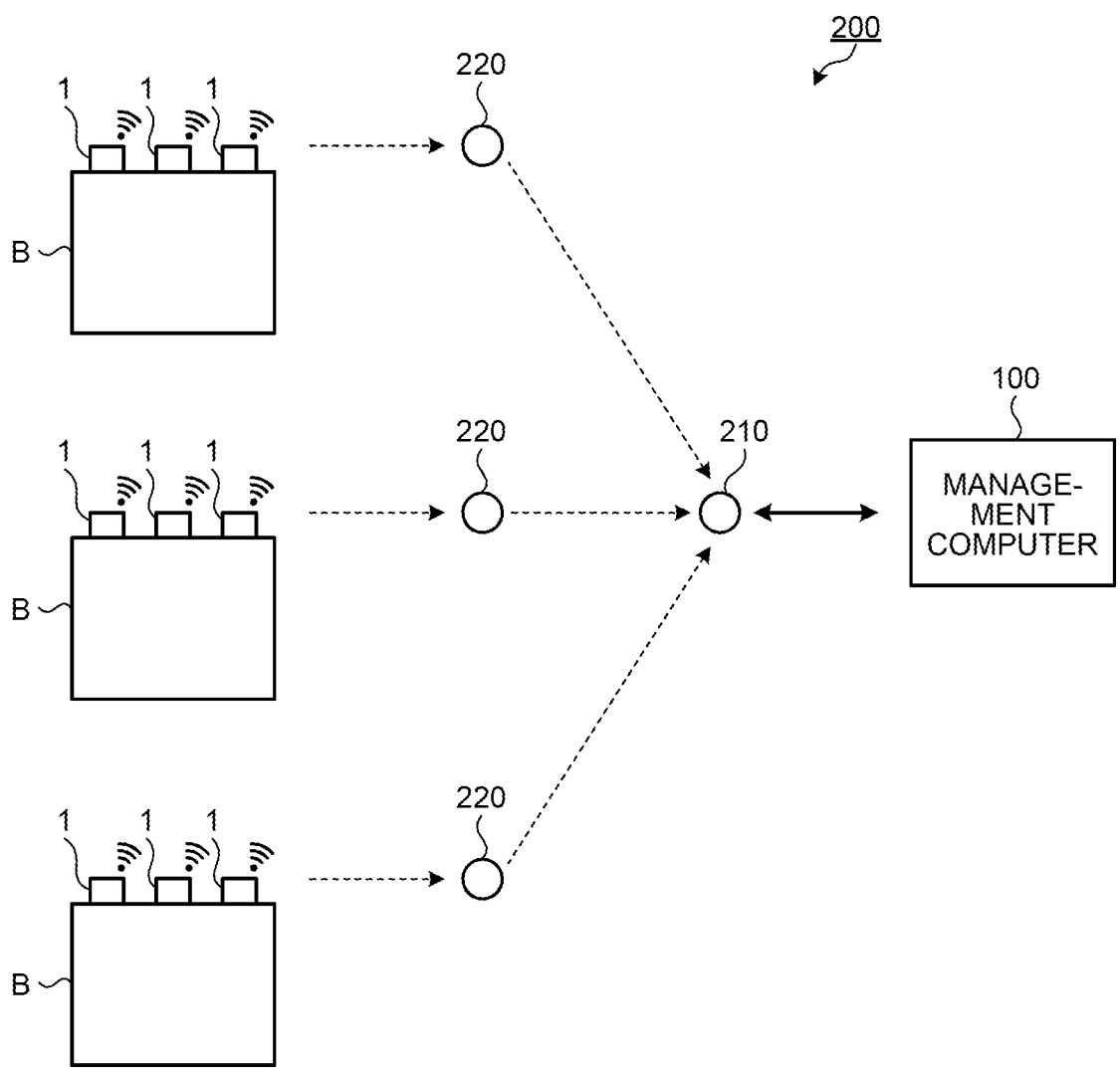
FIG. 10 is a diagram schematically illustrating an analysis system according to a third embodiment.

FIG. 10 is a diagram schematically illustrating an analysis system 200 according to the present embodiment. As illustrated in FIG. 10, the analysis system 200 includes a plurality of analysis devices 1 installed on a machine B, a communication device 210, and a repeater 220. A plurality of the machines B is provided in the industrial facility. As described above, the example of the machine B includes the motor that operates the pump. The machine B may be installed in the basement. When the machine B operates, the machine B generates heat. The machine B functions as a heat source for the analysis devices 1.

The communication device 210 receives detection data of the vibration sensor 6 transmitted from each of the plurality of analysis devices 1 and processed data output by the calculation unit 83, via the repeater 220, and transmits the data to the management computer 100. The communication device 210 processes, for example, the detection data and the processed data transmitted from each of the plurality of analysis devices 1 into a predetermined format, and then transmits the data to the management computer 100. The detection data and the processed data from the plurality of analysis devices 1 are aggregated by the communication device 210 and then transmitted to the management computer 100. The communication device 210 and the management computer 100 may communicate with each other in a wireless manner or a wired manner.

The repeater 220 connects between the analysis device 1 and the communication device 210. A plurality of the repeaters 220 is provided. Each of the repeaters 220 communicates with the communication device 210 in a wireless manner.

The management computer 100 is configured to monitor and manage the state of each of the plurality of machines B, on the basis of the detection data of the vibration sensor 6 transmitted from each of the plurality of analysis devices 1 and the processed data output by each calculation unit 83. The management computer 100 is configured to diagnose the presence/absence of abnormality of each machine B, on the basis of the detection data of the vibration sensor 6 transmitted from each of the plurality of analysis devices 1 and the processed data output by each calculation unit 83.

The plurality of analysis devices 1 is configured to transmit the detection data and the processed data independently. In other words, the analysis device 1 is configured to transmit the detection data and the processed data without being affected by another analysis device 1.

For example, in a case where the machines B and the analysis devices 1 are located in the basement and the communication device 210 and the management computer 100 are located on the ground, the detection data and the processed data that are transmitted from the analysis devices 1 are smoothly transmitted to the management computer 100 due to providing the repeaters 220.

Effects

As described above, in the present embodiment, the analysis system 200 includes the plurality of analysis devices 1 installed on the plurality of machines B, and the communication device 210 that receives the processed data transmitted from each of the plurality of analysis devices 1 and transmits the processed data to the management computer 100. Therefore, the management computer 100 is allowed to monitor and manage the state of the plurality of machines B and diagnose the presence/absence of abnormality in the plurality of machines B.

Other Embodiments

Note that in the embodiments described above, the management computer 100 may include one computer or a plurality of computers.

In the embodiments described above, one housing 20 houses the thermoelectric generation module 5, the vibration sensor 6, the microcomputer 8, and the wireless communication device 9. The thermoelectric generation module 5 may be housed in a first housing, and the vibration sensor 6, the microcomputer 8, and the wireless communication device 9 may be housed in a second housing. The first housing and the second housing are separate housings. The power storage unit 14 may be arranged between the first housing and the second housing.

In the embodiments described above, the function of the calculation unit 83 may be provided in the management computer 100. The detection data of the vibration sensor 6 may be transmitted to the management computer 100 via the wireless communication device 9 so that the management computer 100 may output the processed data. Furthermore, a function of the management computer 100 may be provided in the microcomputer 8. For example, the calculation unit 83 may diagnose the presence/absence of the abnormality.

According to the present disclosure, it is possible to appropriately reduce the data points to be subjected to calculation processing while holding information measured with higher sampling frequency.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An analysis device comprising:
a vibration sensor configured to detect vibration of a machine;
a microcomputer configured to:
determine an average value of detection data of the vibration sensor in each predetermined cycle interval,
convert a plurality of data points included in each interval to one data point indicating the average value to reduce calculation points, and perform a vibration analysis with the reduced calculation points, the vibration analysis including performing a Fast Fourier Transform (FFT) with the reduced calculation points;

a power storage configured to provide power to the microcomputer; and a wireless communication device configured to transmit processed data output from the vibration analysis.

2. The analysis device according to claim 1, wherein the microcomputer is configured to convert a value of each data point of the detection data of the vibration sensor to an absolute value, before reducing the calculation points.

3. The analysis device according to claim 1, further comprising a thermoelectric generation module configured to drive the vibration sensory.

4. An analysis system comprising:

the analysis device according to claim 1; and a management computer configured to receive the processed data transmitted from the analysis device to diagnose the machine.

5. The analysis device according to claim 1, wherein the microcomputer is configured to:

based on determining the average value of the detection data of the vibration sensor in each predetermined cycle interval, double the average value.

6. The analysis device according to claim 1, wherein the reduced calculation points is $1/8$ of the plurality of data points.

7. An analysis method comprising:

acquiring detection data from a vibration sensor configured to detect vibration of a machine;

determining an average value of detection data of the vibration sensor in each predetermined cycle interval;

converting a plurality of data points included in each interval to one data point indicating the average value to reduce calculation points;

performing a vibration analysis with the reduced calculation points, the vibration analysis including performing a Fast Fourier Transform (FFT) with the reduced calculation points; and transmitting processed data output from the vibration analysis.

8. The analysis method according to claim 7, further comprising:

driving the vibration sensor by power generated by a thermoelectric generation module.

9. The analysis method according to claim 7, further comprising:

based on determining the average value of the detection data of the vibration sensor in each predetermined cycle interval, doubling the average value.

* * * * *